(12) United States Patent
Marotta et al.

(10) Patent No.: US 10,310,326 B2
(45) Date of Patent: Jun. 4, 2019

(54) LIQUID CRYSTAL DISPLAY USING THE PHOTOVOLTAIC BEHAVIOR OF LED BACKLIGHTS AS A SOURCE OF ELECTRICAL ENERGY

(71) Applicants: Stacey Lee Marotta, Chester, NJ (US); Thomas J. Germinario, Chester, NJ (US); Bruce McNair, Holmdel, NJ (US)

(72) Inventors: Stacey Lee Marotta, Chester, NJ (US); Thomas J. Germinario, Chester, NJ (US); Bruce McNair, Holmdel, NJ (US)

(73) Assignee: Hyperion Technology, LLC, Chester, NJ (US)

( * ) Notice: Subject to any disclaimer, the term of this patent is extended or adjusted under 35 U.S.C. 154(b) by 4 days.

(21) Appl. No.: 15/641,811

(22) Filed: Jul. 5, 2017

(65) Prior Publication Data

US 2018/0101035 A1   Apr. 12, 2018

Related U.S. Application Data

(60) Provisional application No. 62/406,084, filed on Oct. 10, 2016.

(51) Int. Cl.
*G09G 3/34* (2006.01)
*G02F 1/133* (2006.01)
*G02F 1/1335* (2006.01)

(52) U.S. Cl.
CPC .. *G02F 1/133602* (2013.01); *G02F 1/133603* (2013.01); *G09G 3/342* (2013.01);
(Continued)

(58) Field of Classification Search
CPC combination set(s) only.
See application file for complete search history.

(56) References Cited

U.S. PATENT DOCUMENTS

| 6,664,744 B2 | 12/2003 | Dietz |
| 9,041,697 B2 | 5/2015 | Soto |

(Continued)

FOREIGN PATENT DOCUMENTS

WO   WO2013089554 A1   6/2013

OTHER PUBLICATIONS

Zhu et al. (Polarizing Organic Photovoltaics; 2011 Wiley-VCH Verlag GmbH & Co. KGaA, Weinheim), 2011.*

(Continued)

*Primary Examiner* — Lauren Nguyen
(74) *Attorney, Agent, or Firm* — Thomas J. Germinario

(57) ABSTRACT

A novel liquid crystal display (LCD) is alternately operable in an active display mode, in which its LED array is forward biased and the LEDs emit backlight, or in an inactive display mode, in which the LED array is reverse biased and the LEDs function as photo diodes that harvest the energy of ambient light to generate a photovoltaic (PV) current used to charge the battery of a device, such as a smartphone, in which the LCD is embedded. In one embodiment, the LCD is also alternately operable in a semi-active display mode, in which one or more selected segments of the LED array are forward biased, and the LEDs of the selected segments emit backlight, while one or more unselected segments are reverse biased, and the LEDs of the unselected segments generate the PV current to charge the rechargeable battery.

20 Claims, 4 Drawing Sheets

(52) U.S. Cl.
CPC . *G09G 3/3406* (2013.01); *G02F 2001/13324* (2013.01); *G02F 2001/133531* (2013.01); *G02F 2001/133612* (2013.01); *G02F 2001/133626* (2013.01); *G09G 2310/0256* (2013.01); *G09G 2320/064* (2013.01); *G09G 2360/144* (2013.01)

(56) References Cited

U.S. PATENT DOCUMENTS

| | | |
|---|---|---|
| 9,646,544 B2 | 5/2017 | Soto |
| 2008/0248837 A1 | 10/2008 | Kunkel |
| 2011/0069094 A1* | 3/2011 | Knapp ................ G09G 3/2003 345/690 |
| 2012/0194493 A1 | 8/2012 | Soto |
| 2013/0040707 A1 | 2/2013 | Metcalf |
| 2013/0084919 A1 | 4/2013 | Glynn |
| 2013/0133736 A1 | 5/2013 | Van Bommel et al. |
| 2014/0028957 A1 | 1/2014 | Yang et al. |
| 2015/0221259 A1 | 8/2015 | Soto |
| 2015/0301380 A1 | 10/2015 | Baldo et al. |
| 2016/0218553 A1 | 7/2016 | He et al. |
| 2017/0005235 A1 | 1/2017 | Chou et al. |

OTHER PUBLICATIONS

PCT International Search Report for PCT/US2017/046045, dated Oct. 23, 2017.

Zhu, Kumar & Yang, "Polarizing Organic Photovoltaics," Advance of Materials, 2011, XX, pp. 1-6, Wiley-VCH Verlag GmbH & Co., K G & A, Weinheim.

* cited by examiner

LIQUID CRYSTAL DISPLAY USING THE PHOTOVOLTAIC BEHAVIOR OF LED BACKLIGHTS AS A SOURCE OF ELECTRICAL ENERGY

REFERENCE TO RELATED APPLICATION

This application claims the benefit of the filing date of U.S. Provisional Application No. 62/406,084, filed on Oct. 10, 2016, the entire content of which is incorporated herein by reference.

FIELD OF INVENTION

The present invention relates generally to the field of electronic displays, and more particularly to liquid crystal displays (LCDs) with backlighting provided by light emitting diodes (LEDs).

BACKGROUND OF THE INVENTION

LCDs are used in a variety of electronic devices, including computers, smart phones, e-book readers, and televisions. Transmissive LCDs are typically used to achieve high brightness, contrast and color saturation. Such LCDs have an internal light source, known as a backlight, located at the back of the LCD. The LCD backlight usually comprises an array of LEDs, which can be white LEDs and/or tri-color RGB (red, green, blue) LEDs.

When forward biased, LEDs emit light, which is the sole purpose they serve in a conventional LCD backlight array. But, when exposed to light and reverse biased, LEDs are also capable of photovoltaic (PV) behavior, acting as photodiodes to generate electrical current. Given the increasing power demands of portable electronic devices with LCDs and the limitations of battery power sources, the present invention is designed to leverage the PV behavior of backlight LEDs as a secondary power source for portable LCDs.

SUMMARY OF THE INVENTION

In certain respects, LCDs are better configured for the use of LEDs in a PV/photodiode mode as compared to direct-lighted LED displays, in which the LEDs themselves form the image on the upper part of the display. Because each LED in such direct-lighted displays operates as a distinct pixel which must be individually biased, it's not practical to wire them in series and/or parallel so as to aggregate voltage and/or current from their PV behavior. In an LCD, on the other hand, the articulation of display pixels occurs in the liquid crystal module, allowing the LED backlight array to be wired in series and/or parallel, so as to collect and aggregate the voltage and/or current generated by the individual LEDs in the PV mode.

On the other hand, the multi-layered structure of a backlighted LCDs presents several technical challenges in the PV-LED mode that do not affect direct-lighted LED displays. In the latter, the LEDs are typically on the uppermost layer of the display, separated from ambient light by only the protective glass of the screen. In an LCD, however, the backlight LEDs are beneath/behind a liquid crystal (LC) module, which in turn is usually sandwiched between two orthogonally oriented polarizers. On a pixel-by-pixel basis, the passage of LED light through the LC module is controlled by the voltage applied to each element of the LC, which rotates the polarization angle of the incoming LED light between 0° and 90°. When the LC twists the polarization angle by 90°, the outgoing LED light passes freely through the upper orthogonal polarizer, and the corresponding pixels have maximum brightness. When the LC does not twist the incoming polarization angle at all, the outgoing LED light is totally blocked by the upper orthogonal polarizer, and the corresponding pixels are completely dark.

The same interaction of the LC module with its bracketing orthogonal polarizers acts to block incoming ambient light from reaching the LED backlight array when the display is completely dark—i.e., when the display is off/asleep. Ambient light that passes through the upper polarizer will acquire a polarization angle orthogonal to that of the lower polarizer behind the LC module. But in the dark screen mode, the LC module does not twist the incoming ambient light to enable it to pass through the lower polarizer, so the ambient light cannot reach the LED backlight array to activate its PV behavior.

Another technical challenge associated with the multi-layered LCD structure relates to energy loss caused by the passage of incoming ambient light through the polarizers. Even when the LC module is twisting the polarization angle of the incoming ambient light to allow it to pass through the lower polarizer, the incoming ambient light, in passing through the upper polarizer, has already given up half of its energy, thereby reducing the PV energy-harvesting efficiency of the LEDs by 50%.

As will be explained herein below, the present invention is designed to address the foregoing technical challenges involved in leveraging the PV behavior of backlight LEDs in an LCD display.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1A:
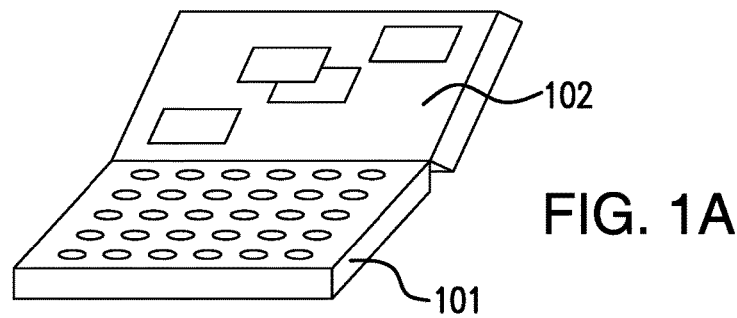
FIGS. 1A-1D depict exemplary portable LCD devices to which the present invention can be applied.
Figure 1B:
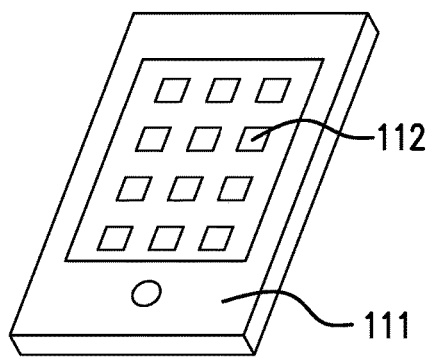
Figure 1C:
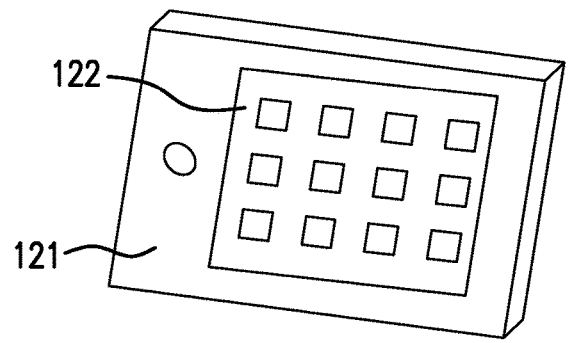
Figure 1D:
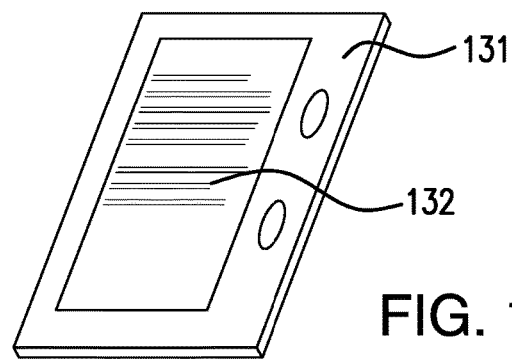

Referring to FIGS. 1A-1D, the energy harvesting LED backlighting of the present invention can be applied to various portable devices, including without limitation: a laptop computer 101 having an LCD screen 102, a smart phone 111 with an LCD screen 112, a tablet computer 121 with an LCD screen 122, and an e-book reader 131 having an LCD screen 132.

Figure 2:
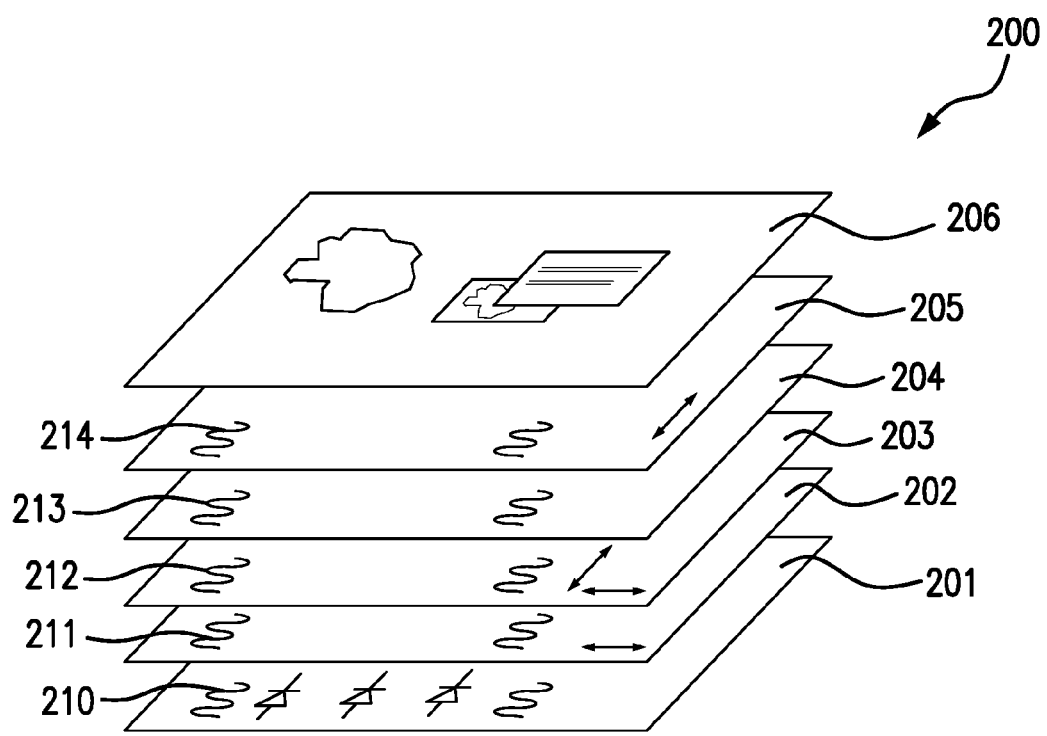
FIG. 2 depicts the structure of an exemplary LCD to which the present invention can be applied.

FIG. 2 depicts, for illustrative purposes, the structure of an exemplary LCD 200 to which one embodiment of the energy harvesting LED backlighting of the present invention is applied. It should be understood that this exemplary LCD 200 represents only one of multiple LCD structures in which embodiments of the present invention can be implemented. A person of ordinary skill in the art will recognize that embodiments of the present invention can be implemented on any LCD that uses an array of LEDs to provide backlight illumination.

In FIG. 2, a backlight LED array 201 comprises multiple LEDs which are electrically interconnected in series and/or parallel circuits. The present invention is most readily implemented for backlight LED arrays 201 comprising white LEDs, in which the circuitry is more adaptable for use in a PV mode than that of RGB LEDs. When forward biased, the LED array 201 emits randomly polarized light 210. This LED light 210 passes through a first (lower) polarizer 202, which permits only horizontally polarized light 211 to pass through. The horizontally polarized light 211 then passes through the liquid crystal (LC) module 203, which comprises a multitude of sections corresponding to the picture elements—known as pixels—of the display. As controlled by the device in which the LCD is embedded, the LC module 203 selectively rotates the polarization angle for each pixel between 0° and 90°, producing light with a reoriented polarization 212.

The reoriented polarized light 212 next passes through a color filter 204 (used with white backlight LEDs), which does not change its polarization, but instead controls the color of each pixel by adjusting the amount of red, green and blue light that makes up each blended pixel color displayed by the LCD 200. The color-filtered light 213 then passes through a second (upper) polarizer 205, which permits only vertical components of the light 214 to pass through. Thus, for example, if the LC module 203 reorients the light's polarization 212 by 90°, all of it will be in the vertical plane and will pass through the second polarizer 205, thereby creating a bright spot in the display 206. But if the light's reoriented polarization 212, after passing through the LC module 203, is 0° (i.e., unchanged), then all of it will remain in the horizontal plane and be blocked by the second polarizer 205, thereby creating a dark spot in the display 206.

Figure 3:
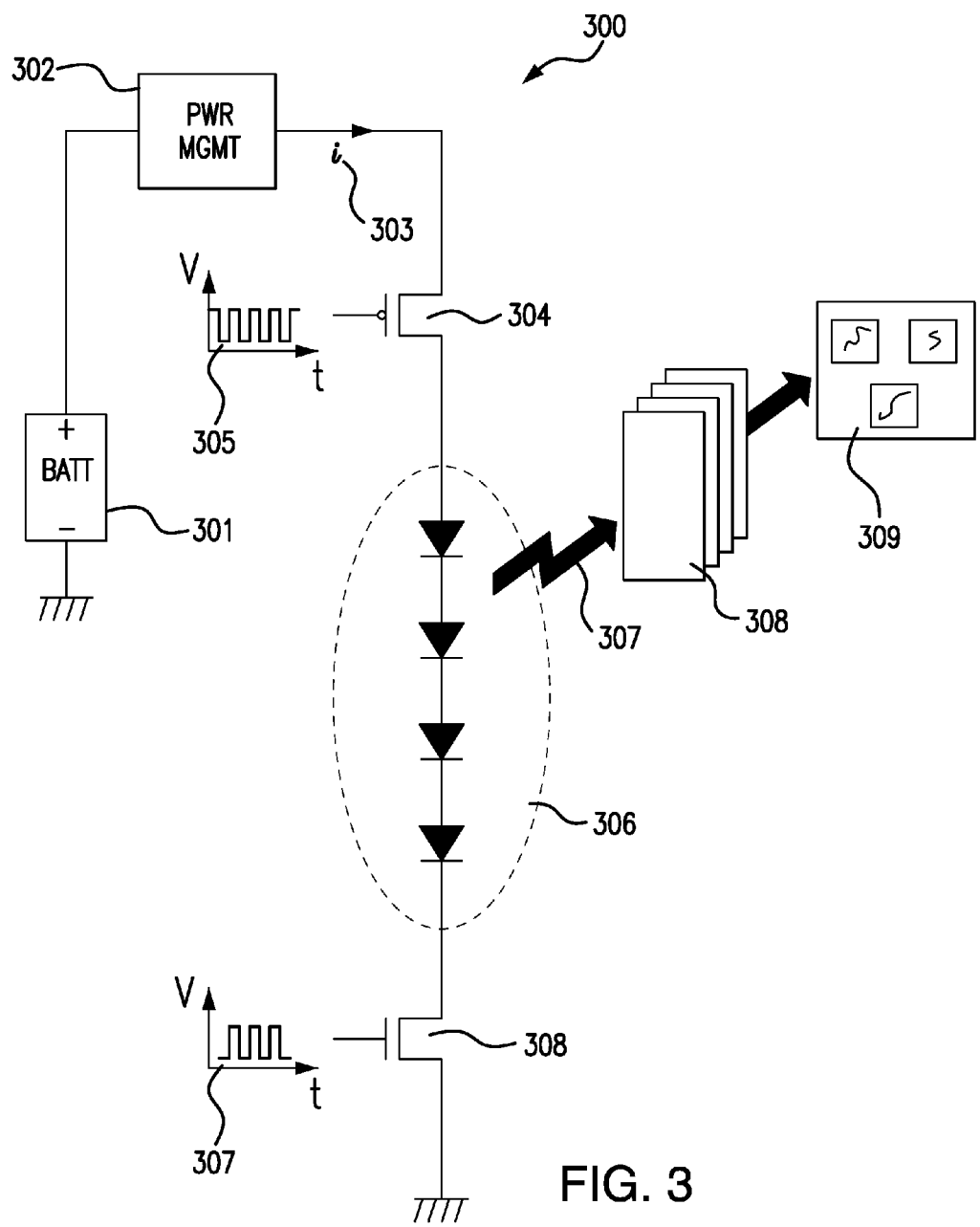
FIG. 3 is a schematic depiction of an exemplary LED backlight array of an exemplary LCD, according to one embodiment of the present invention, as operated in the light-emitting display mode.

FIG. 3 shows a schematic depiction of an exemplary LED backlight circuit 300, operating in the light-emitting display mode. A battery 301 supplies power through a power management circuit 302, causing an electrical current 303 to flow through the circuit 300. This current 303 then flows through a first control transistor 304, then through the LED array 306, so as to forward bias the LEDs, then through a second control transistor 308 to ground.

It will be appreciated by a person of ordinary skill in the art that, while a P-channel MOS transistor is illustrated for the first control transistor 304, and an N-channel MOS transistor is illustrated for the second control transistor 308, this is but one particular representative embodiment. Other mechanisms may be used for these control transistors, and only one of them may be used at the discretion of the circuit designer. In FIG. 3, both control transistors 304 308 are present and are controlled respectively by pulse width modulation (PWM) control signals 305 and 307. These control transistors 304 308 may be used to vary the brightness of the display by the use of pulse width modulation (PWM), as illustrated, or may be used to turn various sections of the LED array 306 on and off. Backlight illumination 307 is generated by the LEDs 306 (corresponding to the LED array 201 in FIG. 2) and passes through layers of the LCD 308 (corresponding to elements 202-205 in FIG. 2), providing the displayed image 309.

Figure 4:
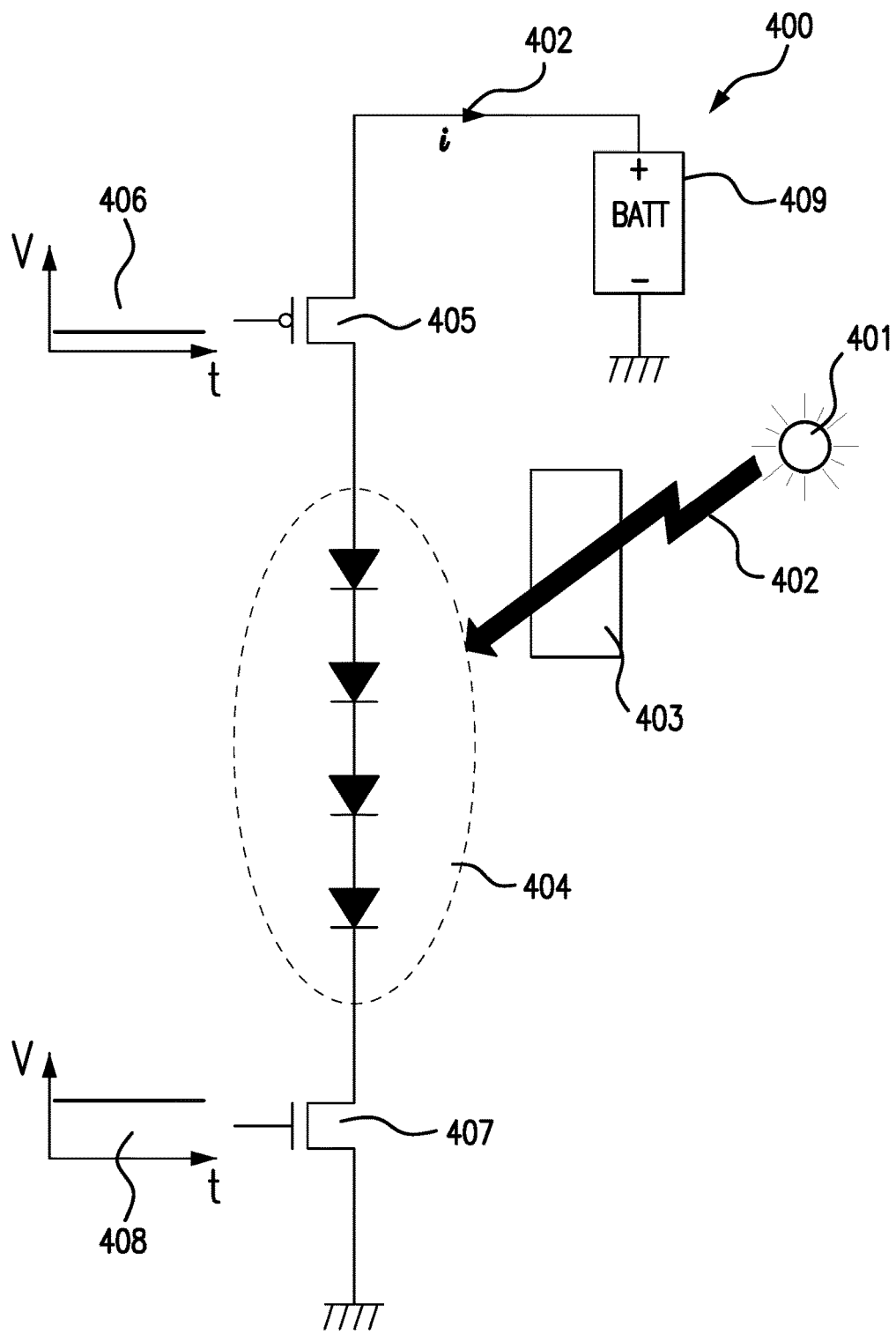
FIG. 4 is a schematic depiction of an exemplary LED backlight array of an exemplary LCD, according to one embodiment of the present invention, as operated in the PV mode.

FIG. 4 shows a schematic depiction of an exemplary LED backlight circuit 400 (corresponding to circuit 300 in FIG. 3), operating in the energy-harvesting mode. Referring to FIG. 4, an external source of illumination 401, provided by natural outdoor light or artificial light, causes ambient light 402 to pass through the LCD layers 403 and provide light to the LED array 404. LCD layers 403 include the LC module 203, as well as elements 202, 204 and 205, described in FIG. 2. While sections of this LC module are set to adjust light polarization to create light or dark areas of the display when used in display mode, when used in the PV energy-harvesting mode of the present invention, the LC module 203 is adjusted to allow ambient light 402 to enter and pass through the LCD layers 403 to the LED array 404. This LED array 404 is the same set of LEDs 306 that are used to provide backlight illumination 307 in FIG. 3. Control transistors 405 and 407 (corresponding to control transistors 304 and 308 in FIG. 3) are biased by control signals 406 and 408 respectively, to reverse bias the LED array 404 and to conduct current 402 generated by the LED array 404. This current 402 is directed to the battery 409 (corresponding to battery 301 in FIG. 3) to provide a means of recharging the battery 409 by use of ambient light 402. While operating as a light energy harvesting device, the bias voltages applied to LC module 203, as well as the control signals applied to control transistors 405 and 407, require no current to flow, so there is essentially no power consumed by this mode of operation.

In accordance with the preferred embodiment of the present invention, the LED backlight circuit is operated in the light-emitting mode 300 when the LCD is on/active, i.e., displaying images. Conversely, when the LCD is off/asleep, i.e., displaying a dark screen, the LED backlight circuit is operated in the PV energy-harvesting mode 400, with the LEDs functioning as photo diodes. However, a person of ordinary skill in the art will appreciate that the present invention can also be configured to harvest energy from specific sections of the LED array 404 during intervals when such LED array sections are turned off by the control transistors 304 308 to control brightness while the display is otherwise active.

In accordance with the preferred embodiment of the present invention, when operated in the PV energy harvesting mode, the LC module 203 is biased to re-orient the polarization angle of incoming ambient light 402 so that this light 402 will pass through the first (lower) polarizer 202 to the LED array 201. But, since the ambient light must first pass through the second (upper) polarizer 205, before it gets to the LC module 203, half of the ambient light 402 has already been filtered out, and its recoverable energy reduced proportionally. In order to compensate for this energy loss, in one embodiment of the present invention, at least the second (upper) polarizer 205, or optionally both polarizers 202 205 are polarizing organic photovoltaics (ZOPVs), as described in the paper "Polarizing Organic Photovoltaics," by Dr. R. Zho, A. Kumar and Prof. Y. Yang of UCLA, published in *Advanced Materials,* 2011, XX, 1-6, which is incorporated herein by reference. In this embodiment, the energy harvested by the ZOPVs in the form of electric current is directed to the battery 409 to supplement the recharging current 402 generated by the LED array 404 operating in the energy-harvesting mode 400.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A liquid crystal display (LCD) comprising:
a backlight module comprising an LED array of multiple light-emitting diodes (LEDs);
a first polarizer located above the backlight module and having a first polarization angle;
a liquid crystal (LC) module located above the first polarizer, wherein the LC module comprises multiple pixel elements, and wherein each pixel element is controlled by a pixel voltage applied to each pixel element to rotate an incident polarization angle of light passing through each pixel element so as to produce a reoriented polarization angle;
a second polarizer located above the LC module and having a second polarization angle;
one or more control circuits which are configured to modulate the brightness of the LEDs in the backlight module and apply a bias voltage to the LEDs, such that the LED array, or one or more segments thereof, are either forward biased or reverse biased, and wherein the control circuits are configured to apply the pixel voltage to each pixel element in the LC module;
a rechargeable battery, which is electrically connected to the LED array through the control circuit(s);
wherein the control circuits are configured to cause the LCD to operate alternately in an active display mode, in which the LED array is forward biased and the LEDs emit backlight, or in an inactive display mode, in which the LED array is reverse biased and ambient light impinges on each of the LEDs to generate a photovoltaic (PV) current in each of the LEDs in the LED array, and wherein the control circuits are configured to conduct a cumulative PV current from the LED array to the rechargeable battery, and wherein the cumulative PV current charges the rechargeable battery; and
wherein, when the LCD is operating in the inactive display mode, the pixel voltage applied to each of the pixel elements by the control circuits causes each pixel element to rotate the incident polarization angle of the ambient light, which is equal to the second polarization angle, to produce the reoriented polarization angle, which is equal to the first polarization angle, so that the ambient light passes through the first polarizer and impinges on each of the LEDs in the LED array so as to generate the PV current in each of the LEDs in the LED array, and wherein the control circuits are configured to conduct the cumulative PV current from the LED array to the rechargeable battery, and wherein the cumulative PV current charges the rechargeable battery.

2. The liquid crystal display (LCD) according to claim 1, wherein the LCD is also alternately operable in a semi-active display mode, in which one or more selected segments of the LED array are forward biased, and the LEDs of the selected segments emit backlight, while one or more unselected segments are reverse biased, and the LEDs of the unselected segments generate the PV current to charge the rechargeable battery.

3. The LCD according to claim 1, wherein the second polarizer comprises a polarizing organic photovoltaic (ZOPV) material, and wherein the ZOPV material in the second polarizer generates a ZOPV current from the ambient light passing through the second polarizer, and wherein the ZOPV current is directed to the rechargeable battery so as to charge the rechargeable battery.

4. The LCD according to claim 3, wherein the first polarizer comprises a polarizing organic photovoltaic (ZOPV) material, and wherein the ZOPV material in the first polarizer generates a ZOPV current from the ambient light passing through the first polarizer, and wherein the ZOPV current is directed to the rechargeable battery so as to charge the rechargeable battery.

5. The LCD according to claim 2, wherein the second polarizer comprises a polarizing organic photovoltaic (ZOPV) material, and wherein the ZOPV material in the second polarizer generates a ZOPV current from the ambient light passing through the second polarizer, and wherein the ZOPV current is directed to the rechargeable battery so as to charge the rechargeable battery.

6. The LCD according to claim 5, wherein the first polarizer comprises a polarizing organic photovoltaic (ZOPV) material, and wherein the ZOPV material in the first polarizer generates a ZOPV current from the ambient light passing through the first polarizer, and wherein the ZOPV current is directed to the rechargeable battery so as to charge the rechargeable battery.

7. The LCD according to claim 1, wherein the one or more control circuits comprise one or more transistors.

8. The LCD according to claim 2, wherein the one or more control circuits comprise one or more transistors.

9. The LCD according to claim 3, wherein the one or more control circuits comprise one or more transistors.

10. The LCD according to claim 4, wherein the one or more control circuits comprise one or more transistors.

11. The LCD according to claim 5, wherein the one or more control circuits comprise one or more transistors.

12. The LCD according to claim 6, wherein the one or more control circuits comprise one or more transistors.

13. The LCD according to claim 1 wherein the LEDs are white LEDs.

14. The LCD according to claim 2 wherein the LEDs are white LEDs.

15. The LCD according to claim 3 wherein the LEDs are white LEDs.

16. The LCD according to claim 4 wherein the LEDs are white LEDs.

17. The LCD according to claim 5 wherein the LEDs are white LEDs.

18. The LCD according to claim 6 wherein the LEDs are white LEDs.

19. The LCD according to claim 7 wherein the LEDs are white LEDs.

20. The LCD according to claim 11 wherein the LEDs are white LEDs.

* * * * *